United States Patent
Genin et al.

(10) Patent No.: US 9,810,152 B2
(45) Date of Patent: Nov. 7, 2017

(54) GAS TURBINE COMBUSTION SYSTEM

(71) Applicant: ALSTOM Technology Ltd, Baden (CH)

(72) Inventors: Franklin Marie Genin, Nussbaumen (CH); Naresh Aluri, Ennetturgi (CH); Jan Cerny, Fahrwangen (CH); Adnan Eroglu, Untersiggenthal (CH); Ennio Pasqualotto, Winterthur (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 359 days.

(21) Appl. No.: 13/936,310

(22) Filed: Jul. 8, 2013

(65) Prior Publication Data
US 2014/0007578 A1    Jan. 9, 2014

(30) Foreign Application Priority Data
Jul. 9, 2012    (EP) .................................... 12175593

(51) Int. Cl.
*F23R 3/34*    (2006.01)
*F02C 7/22*    (2006.01)
(Continued)

(52) U.S. Cl.
CPC .................. *F02C 7/22* (2013.01); *F02C 3/14* (2013.01); *F02C 6/003* (2013.01); *F23C 6/047* (2013.01);
(Continued)

(58) Field of Classification Search
CPC ... F02C 7/22; F02C 3/14; F02C 6/003; F23M 20/005; F23C 6/047; F23C 2201/301;
(Continued)

(56) References Cited

U.S. PATENT DOCUMENTS 2,614,385 A * 10/1952 Feilden .................... F23R 3/46
 417/408
3,315,467 A * 4/1967 De Witt ................. F02C 6/003
 60/39.17
(Continued)

FOREIGN PATENT DOCUMENTS

CN    1162089 A    10/1997
DE    103 30 023    2/2004
(Continued)

OTHER PUBLICATIONS

Third Office Action issued by the Chinese Patent Office dated Nov. 16, 2015 in corresponding Chinese Patent Application No. 201310286007.X, and an English translation thereof.

*Primary Examiner* — Steven Sutherland
(74) *Attorney, Agent, or Firm* — Buchanan Ingersoll & Rooney PC

(57) ABSTRACT

The invention concerns a gas turbine combustion system, including a gas turbine. The gas turbine includes at least one compressor, at least one combustion chamber for generating working gas, wherein the combustion chamber connected to receive compressed air from the compressor, at least one turbine connected to receive working gas from the combustion chamber. The combustion chamber consists of an individual can-combustor or comprising a number of can-combustors arranged in an annular can-architecture, wherein the can-combustor having at least one premixed burner. The ignition of the mixture starts at the premixed burner outlet and the flame is stabilized in the region of the premixed burner outlet by means of a backflow zone. The can-combustor comprising a number of premixed burners arranged uniformly or divided at least in two groups within the can-combustor.

11 Claims, 5 Drawing Sheets

(51) Int. Cl.
  *F23C 6/04* (2006.01)
  *F23R 3/28* (2006.01)
  *F23R 3/46* (2006.01)
  *F02C 3/14* (2006.01)
  *F02C 6/00* (2006.01)
  *F23M 20/00* (2014.01)

(52) U.S. Cl.
  CPC ........... *F23M 20/005* (2015.01); *F23R 3/286* (2013.01); *F23R 3/346* (2013.01); *F23R 3/46* (2013.01); *F23C 2201/301* (2013.01); *F23C 2201/40* (2013.01); *F23C 2900/07002* (2013.01); *F23R 2900/00014* (2013.01); *F23R 2900/03341* (2013.01)

(58) Field of Classification Search
  CPC ........ F23C 2201/40; F23C 2900/07002; F23R 3/286; F23R 3/346; F23R 3/46; F23R 2900/00014; F23R 2900/03341
  USPC ......... 60/737, 740, 738, 747, 748, 749, 733, 60/774
  See application file for complete search history.

(56) References Cited

U.S. PATENT DOCUMENTS

| | | | | |
|---|---|---|---|---|
| 4,192,139 | A * | 3/1980 | Buchheim | F23R 3/346 60/39.826 |
| 4,206,593 | A * | 6/1980 | Su | F02C 6/003 60/39.17 |
| 4,910,957 | A | 3/1990 | Moreno et al. | |
| 5,412,938 | A * | 5/1995 | Keller | F23R 3/40 60/39.21 |
| 5,573,395 | A * | 11/1996 | Althaus | F23D 23/00 431/175 |
| 5,577,378 | A | 11/1996 | Althaus et al. | |
| 5,617,718 | A * | 4/1997 | Althaus | F02C 6/003 60/39.17 |
| 5,626,017 | A | 5/1997 | Sattelmayer | |
| 5,644,918 | A * | 7/1997 | Gulati | F23R 3/002 431/114 |
| 5,687,571 | A * | 11/1997 | Althaus | F23C 5/00 60/737 |
| 5,735,687 | A * | 4/1998 | Knopfel | F23C 7/002 431/115 |
| 5,737,912 | A * | 4/1998 | Krakowitzer | F01K 23/103 60/39.182 |
| 5,797,267 | A * | 8/1998 | Richards | F23R 3/346 60/737 |
| 5,943,866 | A * | 8/1999 | Lovett | F23R 3/286 431/114 |
| 5,983,643 | A * | 11/1999 | Kiesow | F23R 3/34 431/175 |
| 6,209,326 | B1 * | 4/2001 | Mandai | F23C 7/004 60/748 |
| 6,269,646 | B1 * | 8/2001 | Lovett | F23R 3/286 431/114 |
| 6,332,313 | B1 | 12/2001 | Willis et al. | |
| 6,360,525 | B1 * | 3/2002 | Senior | F23R 3/12 60/747 |
| 6,742,338 | B2 * | 6/2004 | Tanaka | F23R 3/343 60/737 |
| 6,935,116 | B2 | 8/2005 | Stuttaford et al. | |
| 2010/0011769 | A1 | 1/2010 | Gambacorta et al. | |
| 2010/0011771 | A1 * | 1/2010 | Evulet | F23R 3/34 60/746 |
| 2011/0265482 | A1 * | 11/2011 | Parsania | F23R 3/286 60/740 |
| 2012/0017601 | A1 | 1/2012 | Eroglu et al. | |

FOREIGN PATENT DOCUMENTS

| | | |
|---|---|---|
| DE | 102004009226 | 9/2004 |
| EP | 0 321 809 | 6/1989 |
| EP | 0646705 A1 | 4/1995 |
| EP | 0 704 657 | 4/1996 |
| EP | 1 055 879 | 11/2000 |
| EP | 1 752 709 | 2/2007 |
| EP | 2 230 459 | 9/2010 |
| JP | H06-50177 | 2/1994 |
| JP | H08-114307 | 5/1996 |
| JP | H09-88628 | 3/1997 |
| RU | 2106573 | 3/1998 |
| RU | 2447304 | 4/2012 |
| WO | 03/060381 | 7/2003 |

* cited by examiner

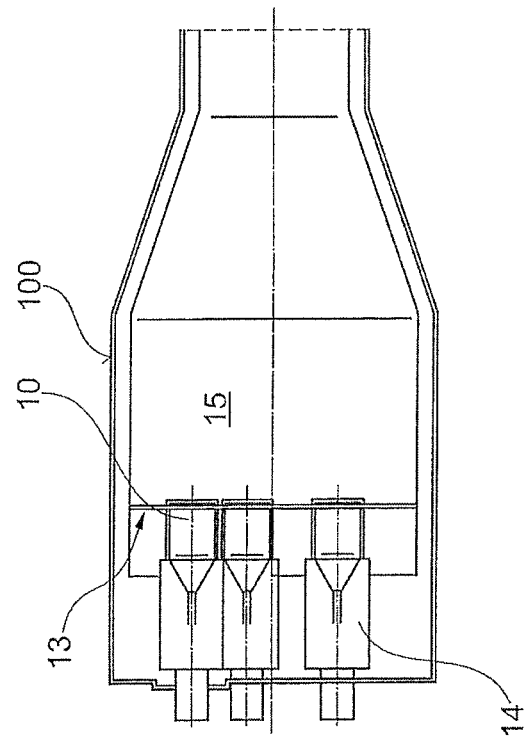
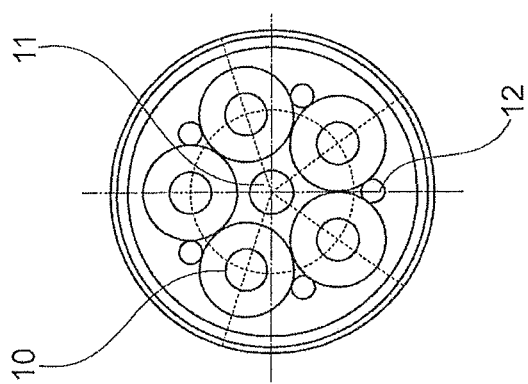

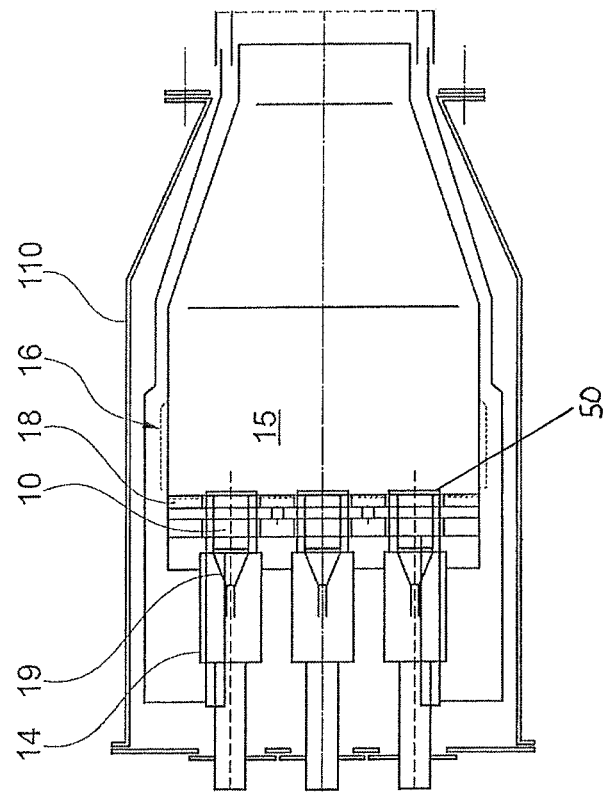
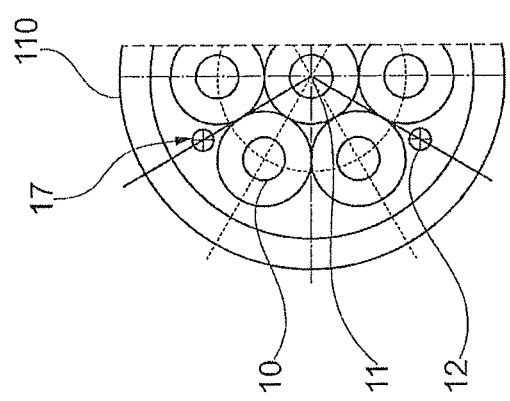
Fig. 2b
Fig. 2a

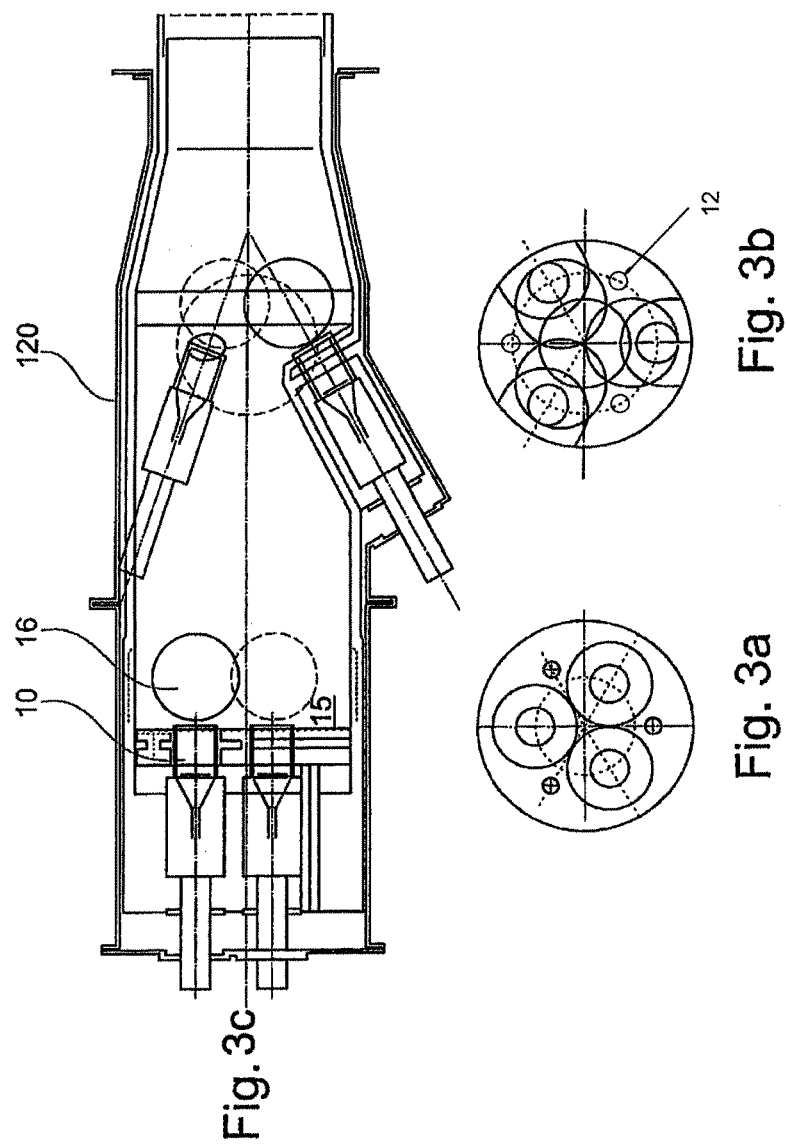

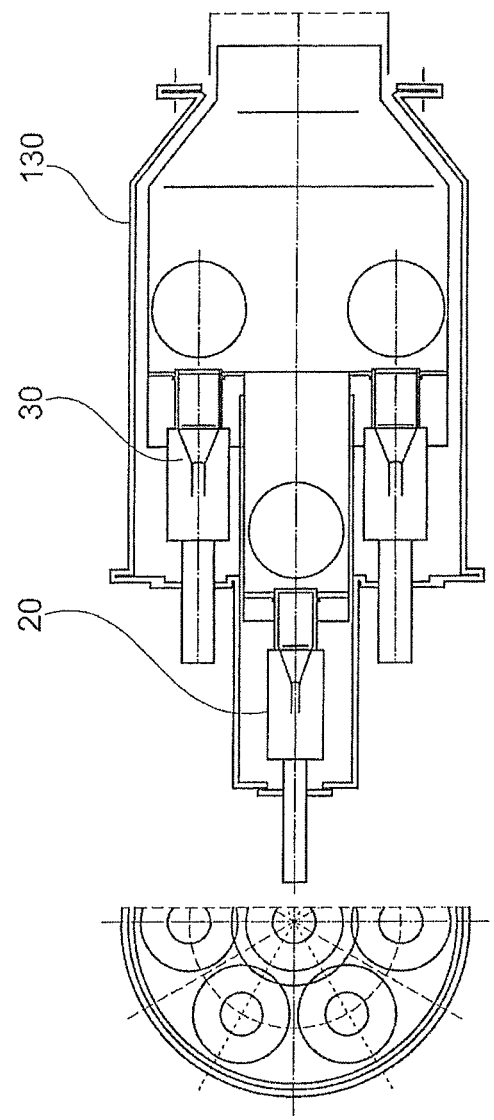

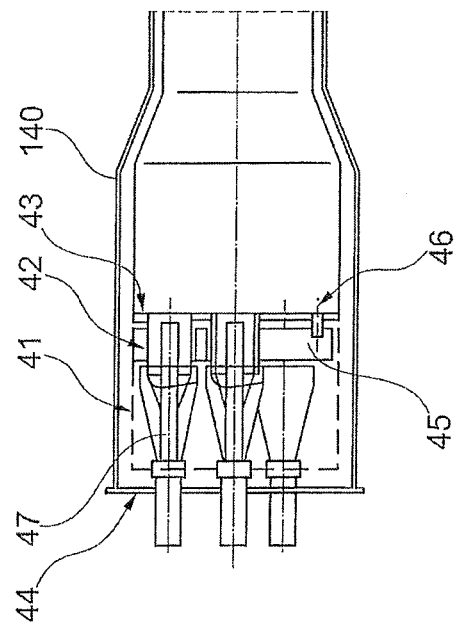
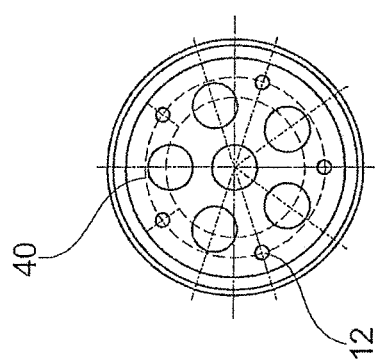
Fig. 5b
Fig. 5a

GAS TURBINE COMBUSTION SYSTEM

CROSS-REFERENCE TO RELATED APPLICATIONS

This application claims priority to European Application number 12175593.8 filed on Jul. 9, 2012, the contents of which are hereby incorporated herein in its entirety.

TECHNICAL FIELD

The invention refers additionally to a method for operating a gas turbine with a can-combustor comprising multiple premixed burners according to the description.

BACKGROUND

U.S. Pat. No. 6,935,116 B1 discloses a gas turbine combustion system for reducing polluting emissions such as NOx and CO, while being able to provide stable combustion at lower load conditions. The combustion system contains a casing having a center axis, which is in fluid communication with the engine compressor, and an end cover fixed to the casing. In the preferred embodiment, the end cover contains a plurality of first injectors arranged in a first array about the end cover and a plurality of second injectors arranged in a second array about the end cover, with the second array radially outward of the first array. Located proximate the end cover is a first swirler, also called swirl generator, having a plurality of passageways oriented generally perpendicular to the casing center axis for inducing a swirl generally radially inward to a first portion of the compressed air. Fuel, which is injected through the first and second injectors, mixes with the first portion of compressed air from the first swirler before entering a liner through a dome section. Additional fuel is also introduced to a second portion of compressed air through a plurality of third injectors located in a manifold of an aft injector assembly. The third injectors are divided into multiple circumferential sectors to allow for various fuels staging circumferentially around the aft injector assembly. To enhance mixing between fuel from the third injectors and second portion of compressed air, a second swirler is positioned adjacent the aft injector assembly for imparting a swirl to the second portion of compressed air. This fuel and air mixes in a second passage located between a first part of the liner and the dome prior to entering the liner and mixing with the fuel and first portion of compressed air from the first swirler region. Upon entering the liner, the pre-mixture from the second passage must undergo a complete reversal of flow direction that causes strong recirculation zones at the forward end of the liner. These recirculation zones help to increase combustor stability by providing a region where a portion of the hot combustion gases can be entrained and recirculate to provide continuous ignition to the incoming premixed fuel and compressed air. Fuel flow to each of the first, second, and third sets of injectors is controlled independently to allow for fuel staging throughout various load conditions to control NOx and CO emissions at each load set-ting.

U.S. Pat. No. 5,577,378 discloses a gas turbine group, comprising at least one compressor unit, a first combustion chamber for generating working gas, wherein the first combustion chamber connected to receive compressed air from the compressor unit. Furthermore, the first combustion chamber being an annular combustion chamber having a plurality of premixing premixed burners. A first turbine connected to receive working gas from the first combustion chamber. A second combustion chamber connected to receive exhausted working gas from the first turbine and deliver working gas to the second turbine. The second combustion chamber comprising an annular duct forming a combustion space extending in a flow direction from an outlet of the first turbine to an inlet of the second turbine; means for introducing fuel into the second combustion chamber for self-ignition of the fuel. A plurality of vortex generating elements mounted in the second combustion chamber upstream of the means for introducing fuel; and, a single rotor shaft supported by not more than two bearings, the at least one compressor unit, where-in first turbine and second turbine being connected on the rotor shaft, wherein the compressor unit consists of at least one compressor. The annular combustion chamber comprises a plurality of individual tubular units defining combustion spaces disposed circumferentially with respect to rotor shaft. The first turbine is configured for partially expanding the working gas so that working gas exhausted from the first turbine has a temperature sufficient for self ignition of a fuel in the second combustion chamber. The vortex generators in the second combustion chamber are shaped and positioned to each generate vortices in the flow. Accordingly, combustion systems of prior art, which utilise premixed burners according to the documents EP 0 321 809 A1 and/or EP 0 704 657 A1 are of silo or annular design type, wherein these documents forming integral parts of the present description.

One of those premixed burners consisting of hollow part-cone bodies making up a complete body, having tangential air inlet slots and feed channels for gaseous and liquid fuels, wherein in that the centre axes of the hollow part-cone bodies have a cone angle increasing in the direction of flow and run in the longitudinal direction at a mutual offset. A fuel nozzle, which fuel injection is located in the middle of the connecting line of the mutually offset centre axes of the part-cone bodies, is placed at the premixed burner head in the conical interior formed by the part-cone bodies.

An other premixed burner substantially consisting of a swirl generator, which substantially consisting of hollow part-cone bodies making up a complete body, having tangential air inlet slots and feed channels for gaseous and liquid fuels. The centre axes of the hollow part-cone bodies have a cone angle increasing in the direction of flow and run in the longitudinal direction at a mutual offset, wherein a fuel nozzle, which fuel injection is located in the middle of the connecting line of the mutually offset centre axes of the part-cone bodies, is placed at the premixed burner head in the conical interior formed by the part-cone bodies. A mixing path provided downstream of said swirl generator, wherein said mixing path comprises transaction ducts extending within a first part of the path in the flow direction for transfer of a flow formed in said swirl generator into the cross-section of flow of said mixing path, that joins downstream of said transition ducts.

Compared to an annular type of design, the state of art does not offer un-confined a higher service-ability. The plurality of premixed burners distributed in circumferential direction does not give possibility to adjust an optimal combustion for each premixed burner load and type of fuel, due to operative interference of adjacent premixed burners.

EP 1 055 879 A1 discloses a combustion chamber assembly which comprises a can-combustor which is a tubular combustion chamber (see column 8, line 35). Along the axis of the tubular combustion chamber a burner arrangement consisting of a fuel injector and a mixing duct is provided which supplies a fuel-air mixture within a first combustion zone inside the can-combustor. Along the sidewall of the can-combustor two further arrangements are provided, each of which injects a fuel-air mixture into the can-combustor. This document does not contain any passages in which the term "premix burner" is disclosed. The combustion zones are significantly spaced apart from the secondary and tertiary fuel and air mixing ducts. So the presumption is obvious that the combustor disclosed in this document is a so called diffusion burner arrangement.

EP 1 752 709 A2 discloses reheat combustion in a gas turbine system. The main aspect refers to a reheat device which is arranged downstream to the first turbine into which a further fuel stream is injected which enhance the temperature increase of the partially expanded working gas stream. This document is silent concerning the shape and embodiment of the combustor Further there is no disclosure concerning the use of a pre-mix burner.

SUMMARY

The present invention is based on the object of proposing an embodiment and a method for operating a gas turbine including a single or sequential combustion with low polluting emissions as NOx and CO and being able to provide stable combustion at the entire operation range, including the lower load conditions on gaseous and liquid fuels, which enables operation with reduced CO emissions.

At least one combustion path of the gas turbine system utilizing at least one can-combustor chamber, and every can-combustor utilizing at least one premixed burner.

The term "can-combustor" is a well-known technical term which refers to a self-contained cylindrical or quasi-cylindrical combustion chamber (tubular combustion space), which may be formed with different cross-sectional areas.

The combustion chamber can consist of a single or a number of individual or with each other interdependent can-combustors, which are arranged in form of a horizontal, oblique, helical, etc., ring around the rotor axis.

A first premix-premixed burner consisting of hollow part-cone bodies making up a complete body, having tangential air inlet slots and feed channels for gaseous and liquid fuels, wherein in that the center axes of the hollow part-cone bodies have a cone angle increasing in the direction of flow and run in the longitudinal direction at a mutual offset. A fuel nozzle, which fuel injection is located in the middle of the connecting line of the mutually offset center axes of the part-cone bodies, is placed at the premixed burner head in the conical interior formed by the part-cone bodies, according to the documents EP 0 321 809 A1, wherein this document forming integral part of the present description.

A further premix-premixed burner arrangement for a heat generator substantially consisting of a swirl generator, substantially according to EP 0 321 809 A1, for a combustion air flow and means for injection of fuel, as well of a mixing tube provided downstream of said swirl generator, wherein said mixing tube comprises transition ducts extending within a first part of the mixing tube in the flow direction for transfer of a flow formed in said swirl generator into the cross-section of flow of said mixing tube, that joins downstream of said transition ducts, according to the document EP 0 704 657 A1, wherein this document forming integral part of the present description.

Further combustion burners comprising conical features of different types for a premix-combustion, namely: no-swirl-burners, burners with at least one axial, radial or conical swirler, or combination thereof for different flow passages.

A can-combustor can be consisting of a combination of different premix-premixed burners, according at least to the above identified premixed burners.

Mixing tube of the premixed burner can be integrated with the conical swirler or with the front face of the can-combustor. The clearance in the connection of conical swirler and the mixing tube is designed to allow for a small air flow entering the mixing tube and creating a flash back protecting air boundary layer. The mixing tube is straight or shaped at the exit to create the desired flow field at the exit to the can-combustor.

Accordingly, the conical swirler is optimized dependent on and what type of a fuel lance is used.

The primary premix gas injectors are placed in the optimized air slots of the conical swirler (see EP 0 321 809 A1). The secondary gas premix injectors can be placed on the fuel-lance. The gas pilot injectors can be placed on the exit ring of the mixing tube or on the lance. Detached pilot gas injectors can be placed between the premixed burners.

The main oil injectors are placed on the lance or in the top of the conical swirler. The pilot oil injectors are placed on the exit ring of the mixing tube or on the fuel-lance. Detached pilot oil injectors can be placed between the premixed burners.

All the burners can have the same rotational direction of the swirler or it can be combination of two burner groups, one co-rotation and the second counter-rotation swirl direction.

The described plurality of injection points and different types of injectors in different axial positions together with a possible axial distance between two premixed burner groups and azimuthally staging of the premixed burners provides conditions for optimal operation of the can-combustor over the whole operating range.

Additionally, the combustion system consists of a pressure caring-casing, mounted on the turbine casing and being in fluid interconnecting with the engine compressor. The outgoing of the combustion system is in fluid communication with the turbine.

Furthermore, the combustion system consists of components, each with a defined precise function. A hot combustor liner contains the combustion room and transfers the hot gases through an exit nozzle to the turbine. The hot side of the liner is heat protected advantageously by thermal barrier coating. On the outside of the combustor liner a cooling channel is formed by a shell and/or by the casing of the combustion system itself. The combustion air is flowing through this channel and cooling the hot combustor liner. To increase the cooling efficiency the surface of the liner is provided with turbulators, also called vortex generators (see DE 103 30 023 A1 wherein this document forming integral part of the present description), and the height of the channel is chosen to create an optimal air velocity required for sufficient cooling at lowest possible pressure drop. It is further suggested to use the cooling holes at or near the vortex generators in a targeted manner for introducing an additional axial impulse. This can be achieved by modifying part of the cooling holes in such a way that an increased axial impulse is introduced into the core flow of the wave vortices. For this purpose, the geometry of the outlet openings is configured accordingly, for example with respect to their orientation and/or throughput.

For recovery of a dynamic pressure the exit of the cooling channel to the premixed burner hood is shaped advantageously as a diffuser. Equalizing of the airflow field in the premixed burner is possible in connection with a strainer with optimized distribution of holes, surrounding the hood. In an alternative design the strainer is, if required, replaced by individual sieves, at the inlet of each individual premixed burner.

The number of the installed premixed burners with the conical swirlers according to the above identified embodiments is chosen optimally for the required power output of the combustion system and the required concept with consideration of the combustion stability and pollution emissions in the whole operation range.

The total number of the premixed burners, absolute or relative to each can-combustor, can be split in two independent groups, separated from each other, both on the air side (separate hoods), and on the combustion size, with not interacting flames.

Furthermore, the cap of the can-combustor is designed for an easy access to the pre-mixed burners and a service friendly handling of the system. The conical swirler and the fuel-lance can be integrated for dismantling with the cap, while the mixing tube is integrated with the front face. In case of design with a conical swirler integrated with the mixing tube (see EP 0 704 657 A1) and eventually with a sieve each individual pre-mixed burner can be dismantled separately. In this context, the fuel-lances are always designed for an individual dismantling.

Furthermore, the front face of the can-combustor can be cooled in an open cooling loop, where the cooling air is bypassing the conical swirlers in acoustic liner segments. In a closed cooling loop the cooling air returns to the hood after impingement cooling of the backside of the combustor front face, and to the swirlers.

The invented design offers a plurality of means for control of the combustion dynamics for further improvement of the can-combustor operability. The high frequency combustion dynamics is, if necessary, controlled by segments of acoustic liner which is attached to the periphery of the combustor liner or by an acoustical front panel.

The low frequency dynamics is, if necessary controlled by Helmholtz type of dampers.

Dependent on the burner spacing, the damper is designated advantageously as a free-standing cylindrical Helmholtz cavity and neck or as a Helmholtz cavity in the free space between the mixing tubes, divided into sectors to prevent gas ingestion and allow for individual tuning.

Additionally, the combustion dynamics can further be improved by tuning of the length of the mixing tubes, individually for each burner.

The main advantages of the invented design are as follows, wherein the sequence does not reflect a rating:

High serviceability compare to another design, wherein an annular design in combination with a can-architecture can be improved a favorable serviceability.

Reduced development time and cost due the possibility for a complete "in house" development before implementing it in an engine.

Tailoring of the combustion system for the next generation of the premixed burners with conical swirler and shaped mixing tubes.

The relatively small size of the can-combustor allows for a cost effective sheet metal design. The engine service time and cost can be reduced in light of the fact that the can-combustor's cost and life is properly optimized.

The compact size allows for a design with limited number of wearing and tearing parts and therefore for a low sensitivity for combustion dynamics.

Possibility for implementing of axial-, radial-, azimuthal-staging, grouping of the premixed burners in two or more positions, co-swirling or mixed co-swirling and counter-swirling burners.

Implementation of acoustical and other passive damping devices for low emissions and controlled combustion dynamics over a wide operating range.

The can-combustor can cover a wide range of engine sizes in light of its modular design. The size of the combustion system is limited only by size of the accessible high pressure combustion test plant. The number of can-combustors foe an engine is chosen based on the engine size.

A can-combustor-architecture helps to reduce circumferential temperature gradients at the turbine inlet. These benefits in an increase of the lifetime of turbine parts.

In terms of CO emissions for a can-combustor architecture the interaction between individual can-combustors is minimal or inexistent. On top of this leakages at the split plane, which are known to affect CO for annular concepts, will not impact the CO for a can-combustor engine, since for this architecture split line leak-ages into the combustor exist only at the latest end of the transition piece.

Based on these findings the concept can be expected to work for an engine, which runs under sequential combustion (with or without an intermediate high pressure turbine) in a can-architecture, but not only.

Basically, a single can-combustor comprising a number of premixed burners can be operated as a single combustion chamber.

Referring to a sequential combustion the combination of two main-combustors (combustion chambers) can be disposed as follows.

Principal embodiment: At least one combustion chamber is configured as annular can-combustor architecture, with at least one operating turbine.

Principal embodiment: Both, the first and second combustion chambers are configured as sequential can-combustor architecture, with at least one operating turbine.

Principal embodiment: Both, the first and second combustion chamber are configured as sequential can-combustor architecture with at least an intermediate operating turbine between the first and the second combustion chamber.

Further embodiment: The first main-combustor is configured as an annular combustion chamber and the second main-combustor is built-on as a can configuration, with at least one operating turbine.

Further embodiment: The first main-combustor is configured as a can-architecture and the second main-combustor is configured as an annular combustion chamber, with at least one operating turbine.

Further embodiment: Both main-combustors, the first and second combustor, are configured as annular combustion chambers, with at least one operating turbine.

Further embodiment: Both main-combustors, the first and second combustor, are configured as annular combustion chambers, with an intermediate operating turbine.

BRIEF DESCRIPTION OF THE DRAWINGS

The invention is shown schematically in FIGS. 1 to 5 based on exemplary embodiments.

Schematically, in the drawings:

FIGS. 1a and 1b show an individual can-combustor comprising 5 removable premixed burners;

FIGS. 2a and 2b show an individual can-combustor comprising 7 removable premixed burners;

FIGS. 3a, 3b and 3c show a can-combustor comprising 2×3 removable premixed burners, axially staged;

FIGS. 4a and 4b show a can-combustor comprising 7 removable premixed burners, with one central burner axially retracted to avoid interaction with the remaining burners; and FIGS. 5a and 5b show a can-combustion system with 6 premixed burners, integrated with cap, and with integrated acoustical front.

DETAILED DESCRIPTION

FIG. 1b shows a can-combustor 100, which enables an individual combustion operation, and which will be no harmful interaction among other individual can-combustors during the combustion operation. The can-combustor 100 comprises a number of removable premixed burners 10. Thus, the can-architecture in accordance with FIG. 1b comprises a plurality of premixed burners 10 arranged on the can-combustor front face 15, which enables an individual combustion operation.

The premixed burner 10, for example according to EP 0 704 657 A1, consisting of a swirl generator, substantially according to EP 0 321 809 A1, for a combustion air flow and means for injection of fuel, as well of a mixing path, formed of a mixing tube, provided downstream of said swirl generator, wherein said mixing path comprises transition ducts extending within a first part of the path in the flow direction for transfer of a flow formed in said swirl generator into the cross-section of flow of said mixing path, that joins downstream of said transition ducts.

The swirl generator according to EP 0 321 809 A1 consisting of hollow part-cone bodies making up a complete body, having tangential air inlet slots and feed channels for gaseous and liquid fuels, wherein in that the center-axes of the hollow part-cone bodies have a cone angle increasing in the direction of flow and run in the longitudinal direction at a mutual offset. A fuel nozzle, which fuel injection is located in the middle of the connecting line of the mutually offset center-axes of the part-cone bodies, is placed at the burner head in the conical interior formed by the part-cone bodies.

The swirl intensity and swirl direction in the swirl generator is selected via its geometry in such a way that the vortex breakdown does not take place in the mixing tube but further downstream at the combustion chamber inlet. The length of the mixing tube is selected so that an adequate mixing quality for all types of fuel is obtained. In the mixing tube, the axial-velocity profile has a pronounced maximum on the axis and thereby prevents flash-backs in this region. The axial velocity decreases toward the wall. In order to also prevent flash-back in this area, various measures are taken: On the one hand, for example, the overall velocity level can be raised through the use of a mixing tube having a sufficiently small diameter. The vortex breakdown is highly dependent from the design that the combustion chamber having a jump in cross-section adjoins the end of the mixing tube. The ignition of the fuel/air-mixture starts at the premixed burner outlet and the flame is stabilized in the region of the premixed burner outlet by means of a backflow zone.

The documents EP 0 321 809 A1 and/or EP 0 704 657 A1 forming an integral part of the present description.

In particular, said premixed burners can be operated with liquid and/or gaseous fuels of all kinds. Thus, it is readily possible to provide different fuels within the individual cans. This means also that a premixed burner 10 can also be operated simultaneously with different fuels.

An acoustical front panel 13 is placed on the can-combustor front face 15. Upstream of every premixed burner 10 they are actively connected to an air-plenum 14 for subsequent efficient premixing operation.

The gas turbine system comprises essentially at least one compressor, a first main-combustor which is connected downstream to the compressor. The hot gases of the first main-combustor are admitted at least to an intermediate turbine or directly or indirectly to a second main-combustor. The hot gases of the second combustion chamber are admitted to a further turbine or directly or indirectly to an energy recovery, for example to a steam generator Accordingly, implementing a sequential combustion path, the totality of the operated can-combustors of the first and/or second combustion chambers are designed and disposed as an annular can-architecture.

Additionally, FIG. 1a shows the placing for a Helmholtz damper 11 and for a pilot nozzle 12 within the premixed burner arrangement of the can-combustors 100. Furthermore, a plurality of Helmholtz dampers 11 are taken place for damping of low frequency pressure oscillations connected to the combustion room though openings in the front-panel 13.

The combination of a premixed burner arrangement within a single can-combustor 100 thereby provides the opportunity to produce low emissions combustion at various load conditions of the gas turbine system. Furthermore, the optimized placing for a Helmholtz damper 11 and for a pilot nozzle 12 within the premixed burner arrangement of every can-combustor 100 provides additionally the opportunity for reducing polluting emissions such as NOx and CO, while being able to provide stable combustion at lower load condition. The premixed burner system can be equipped with non-premixed or partially premixed pilot nozzles 12 at burner exit on the exit ring or on a fuel lance for ignition and reduction of the lean blow off temperature at part load operation. Alternatively, a number of part load pilot nozzles is placed in-between the premixed burners 10.

FIG. 2b shows a can-combustor 110, which enables an individual combustion operation, and which will not have a harmful interaction among other individual can-combustors during the combustion operation. The can-combustor 110 comprises a number of removable premixed burners 10. Thus, the can-architecture in accordance with FIG. 2b comprises a plurality of premixed burners 10 having transition ducts 50 arranged on the can-combustor front face 15, which enables an individual combustion operation.

The premixed burner 10, for example according to EP 0 704 657 A1, consisting of a swirl generator, substantially according to EP 0 321 809 A1, for a combustion air flow and means for injection of fuel, as well of a mixing path, formed of a mixing tube, provided downstream of said swirl generator, wherein said mixing path comprises transaction ducts extending within a first part of the path in the flow direction for transfer of a flow formed in said swirl generator into the cross-section of flow of said mixing path, that joins downstream of said transition ducts.

The swirl generator according to EP 0 321 809 A1 consisting of hollow part-cone bodies making up a complete body, having tangential air inlet slots and feed channels for gaseous and liquid fuels, wherein in that the center-axes of the hollow part-cone bodies have a cone angle increasing in the direction of flow and run in the longitudinal direction at a mutual offset. A fuel nozzle, which fuel injection is located in the middle of the connecting line of the mutually offset center-axes of the part-cone bodies, is placed at the burner head in the conical interior formed by the part-cone bodies.

The swirl intensity in the swirl generator is selected via its geometry in such a way that the vortex breakdown does not take place in the mixing tube but further downstream at the combustion chamber inlet. The length of the mixing tube is selected so that an adequate mixing quality for all types of fuel is obtained. In the mixing tube, the axial-velocity profile has a pronounced maximum on the axis and thereby prevents flash-backs in this region. The axial velocity decreases toward the wall. In order to also prevent flash-back in this area, various measures are taken: On the one hand, for example, the overall velocity level can be raised through the use of a mixing tube having a sufficiently small diameter. The vortex breakdown is highly dependent from the design that the combustion chamber having a jump in cross-section adjoins the end of the mixing tube. A central backflow zone forms here the properties which are those of a flame retention baffle.

The documents EP 0 321 809 A1 and/or EP 0 704 657 A1 forming an integral part of the present description.

In particular, said premixed burners can be operated with liquid and/or gaseous fuels of all kinds. Thus, it is readily possible to provide different fuels within the individual cans. This means also that a premixed burner 10 can also be operated simultaneously with different fuels.

A number of 6 segments 16 of acoustic liner are placed between the premixed burners 10. Upstream of every premixed burner 10 they are actively connected to an airplenum 14 for subsequent efficient premixing operation.

The gas turbine system comprises essentially at least one compressor, a first main-combustor which is connected downstream to the compressor. The hot gases of the first combustion chamber are admitted at least to an intermediate turbine or directly or indirectly to a second combustion chamber. The hot gases of the second combustion chamber are admitted to a further turbine or directly or indirectly to an energy recovery, for example to a steam generator Accordingly, implementing a sequential combustion path, the totality of the operated can-combustors of the first and/or second combustion chamber are designed and disposed as an annular can-architecture.

Additionally, FIG. 2a shows the placing for a Helmholtz damper 11 and for a pilot nozzle 12 within the premixed burner arrangement of the can-combustors 110. On the one hand, it is possible that a plurality of Helmholtz dampers 11 are taken place for damping of low frequency pressure oscillations connected to the combustion room though openings in the front of the can-combustor 10. With respect to FIG. 2b it is possible to dispose a continuous or segmented acoustic liner 16 close to the combustor front face 15, optimized for damping of high frequency acoustic pressure oscillations. FIG. 2a in combination with FIG. 2b shows a closed cooling loop 17 where the cooling air is flowing to a manifold, and is distributed to an impingement cavity, and after impingement cooling of the back side of the can-combustor front face 18 returns to the hood and enters the burner swirl generators 19. For this procedure cooling air for the closed cooling loop is fed from an air source with higher static pressure than pressure in the hood as shown in FIG. 2b.

The combination of a premixed burner arrangement within a single can-combustor 110 thereby provides the opportunity to produce low emissions combustion at various load conditions of the gas turbine system. Furthermore, the optimized placing for a Helmholtz damper 11 and for a pilot nozzle 12, as shown in FIGS. 1b and 1a, or a continuous or segmented acoustic liner 16 within the premixed burner arrangement of every can-combustor 110 provides additionally the opportunity for reducing polluting emissions such as NOx and CO, while being able to provide stable combustion at lower load condition.

Moreover, the can-combustor with respect to the FIG. 2b can contain all features which have been described in the preceding FIG. 1b.

FIG. 3c shows a can-combustor 120 comprising 2×3 removable burners 10, axially staged, with closed cooling according to the FIG. 2b. The premixed burners of the can-combustor are divided in two groups (FIGS. 3a and 3b), each with one or more pre-mixed burners. The first one (FIG. 3a) is positioned in the combustor face 15; the second one (FIG. 3b) is positioned downstream of the first group in an axial position, where the blockage by the recirculation zones of the first group (FIG. 3a) ceased. The premixed burners 10 of the second group (FIG. 3b) operate in an oblique position with respect to the axial extension of the can-combustor 120. Accordingly, the size of the first group (FIG. 3a) with respect to burner diameter and number of burners is chosen so that it can operate stable at low gas turbine part loads on low emissions, undisturbed by the cold airflow from the at part-load non-fired premixed burners of the second group (FIG. 3b).

The combination of sequential operating premixed burners in at least two groups within a single can-combustor 120 thereby provides the opportunity to produce low emissions combustion at various load conditions of the gas turbine system. Furthermore, the optimized placing for a Helmholtz damper (not shown) or a continuous or segmented acoustic liner 16 within the premixed burner arrangement of every can-combustor 120 provides additionally the opportunity for reducing polluting emissions such as NOx and CO, while being able to provide stable combustion at lower load condition.

Moreover, the can-combustor with respect to the FIG. 3c can contain all features which have been described in the preceding figures.

FIGS. 4b and 4a show a can-combustor comprising 7 removable premixed burners, with one central burner 20 axially retracted to avoid interaction with the remaining burners 30.

The totality of the premixed burners is divided in two groups. The first group consisting at least of one premixed burner, retracted axially to a position where its recirculation zone does not interact with the recirculation zones of the second group. The size of the first group 20 relating to burner diameter or number of burners is chosen so that it can operate stable at low gas turbine part loads on low emissions, undisturbed by the cold airflow from the at part-load non-fired second group premixed burners 30.

Moreover, the can-combustor with respect to the FIG. 4 can contain all features which have been described in the preceding figures.

FIGS. 5b and 5a show a can-combustor 140 comprising 6 premixed burners 40 with conical swirler and long lances 47, integrated with cap 44. Accordingly, the conical swirler and fuel lances are part of the can-combustor 40. The even distribution of the air to the individual premixed burners 40 is supported, if required, by sieves positioned around the conical swirler or by a strainer 41 for equalizing of the airflow field, approaching the conical swirler. Conical swirler and fuel lances can be integrated with cap 44. The mixing tube 42 is integrated with acoustical front panel 43. A segmented Helmholtz cavity 45 is integrated with the acoustical front panel 43. The premixed burners 40 are equipped with premixed or non-premixed or partially premixed pilot nozzles 12 (see FIG. 5*a*) at burner's exit for ignition or reduction of the lean blow off temperature at part-load operation. Alternatively, a number of part-load pilot nozzles is placed in-between the premixed burners 40. The acoustical front panel 43 can be segmented and the segments tuned to control a variety of can-combustor high frequency pressure oscillations and to cool the face of the front panel 43. The segmented azimuthally conducted Helmholtz cavity in the hood is positioned between the mixing tubes. The segments of the cavity are individually connected by their necks 46 to the combustion room and individually tuned to control variety of the can-combustor low frequency pressure oscillations.

Moreover, the can-combustor with respect to the FIG. 5*b* can contain all features which have been described in the preceding figures.

Obviously, numerous modifications and variations of the present invention are possible in light of the above teachings. It is therefore to be understood that within the scope of the appended claims, the invention may be practiced otherwise than as specifically described herein.

What is claimed is:

1. A gas turbine combustion system including a gas turbine, wherein the gas turbine comprises:
   at least one compressor;
   at least one combustion chamber for generating working gas, wherein the at least one combustion chamber is connected to receive compressed air from the at least one compressor; and
   at least one turbine connected to receive working gas from the at least one combustion chamber,
   wherein the at least one combustion chamber includes at least two can-combustors arranged in an annular can-architecture,
   wherein each can-combustor includes a plurality of premixed burners, wherein the plurality of premixed burners of each can-combustor is divided in two groups, each with one or more premixed burners, wherein a first group is positioned in a can-combustor face and a second group is positioned downstream of the first group in an axial position, wherein one or more premixed burners of the second group is axially aligned in an oblique position with respect to an axial extension of each can-combustor; and
   wherein ignition of a mixture of air and fuel starts at each premixed burner outlet of the second group and a flame is stabilized in a region of the outlet of each premixed burner of the second group by a backflow zone.

2. The gas turbine combustion system according to claim 1, wherein each of the plurality of premixed burners comprises a swirl generator that includes hollow part-cone bodies making up a complete body, having tangential air inlet slots and feed channels for gaseous and liquid fuels, wherein center axes of the hollow part-cone bodies have a cone angle increasing in a direction of flow and run in a longitudinal direction at a mutual offset, wherein a fuel nozzle, which fuel injection is located in a middle of a connecting line of mutually offset center axes of the hollow part-cone bodies, is placed at a burner head in a conical interior formed by the hollow part-cone bodies, and a mixing tube provided downstream of said swirl generator, wherein said mixing tube comprises transition ducts extending within a first part of a path in a flow direction for transfer of a flow formed in said swirl generator into a cross-section of flow of said mixing tube, that joins downstream of said transition ducts.

3. The gas turbine combustion system according to claim 2, wherein the mixing tube is shaped with variable diameter and/or length along an axis of a respective pre-mixed burner.

4. The gas turbine combustion system according to claim 2 wherein each premixed burner comprises a premixed, or partially pre-mixed or non-premixed pilot nozzle for ignition and reduction of a lean blow off temperature at part-load operation.

5. The gas turbine combustion system according to claim 4 wherein the premixed, or partially pre-mixed or non-premixed pilot nozzle is arranged at one of said one or more premixed burners' exit, or on a fuel lance of the swirl generator, or is placed in-between a plurality of premixed burners.

6. The gas turbine combustion system according to claim 2 wherein low frequency dynamics of each can-combustor is controlled by a Helmholtz damper, wherein the Helmholtz damper is a freestanding cylindrical Helmholtz cavity and neck, or a Helmholtz cavity in a free space between the mixing tubes of the premixed burner.

7. The gas turbine combustion system according to claim 6, wherein each Helmholtz damper is divided into segments to prevent low frequency pressure oscillations.

8. The gas turbine combustion system according to claim 2 wherein distribution of compressed air from the at least one compressor to each premixed burner is supported by sieves or a strainer positioned around of the swirl generators.

9. The gas turbine combustion system according to claim 1 wherein said can-combustor face of each can-combustor is designed as an acoustic damper for damping of high frequency acoustic pressure oscillations.

10. A gas turbine combustion system, including a gas turbine, wherein the gas turbine comprises:
    at least one compressor;
    a first combustion chamber for generating working gas, wherein the first combustion chamber is connected to receive compressed air from the at least one compressor, and
    wherein hot gases of the first combustion chamber are admitted at least to an intermediate turbine or directly or indirectly to a second combustion chamber, and
    wherein hot gases of the second combustion chamber are admitted to a further turbine or directly or indirectly to an energy recovery, and
    wherein the first and/or the second combustion chamber includes at least two can-combustors arranged in an annular can-architecture,
    each can-combustor including a plurality of premixed burners, wherein ignition of a mixture of air and fuel starts at a premixed burner outlet and a flame is stabilized in a region of each premixed burner outlet by a backflow zone, wherein the plurality of premixed burners of each can-combustor is divided in two groups, each with one or more premixed burners, wherein a first group is positioned in a can-combustor face and a second group is positioned downstream of the first group in an axial position, wherein one or more premixed burners of the second group is axially aligned in an oblique position with respect to an axial extension of each can-combustor.

11. The gas turbine combustion system according to claim 10, wherein each premixed burner comprises a swirl generator, each swirl generator includes hollow part-cone bodies making up a complete body, having tangential air inlet slots and feed channels for gaseous and/or liquid fuels, wherein center axes of the hollow part-cone bodies have a cone angle increasing in a direction of flow and run in a longitudinal direction at a mutual offset, wherein a fuel nozzle, which fuel injection is located in a middle of a connecting line of mutually offset center axes of the hollow part-cone bodies, is placed at a burner head in a conical interior formed by the hollow part-cone bodies.

* * * * *